Maximum Current (175 milliamperes)

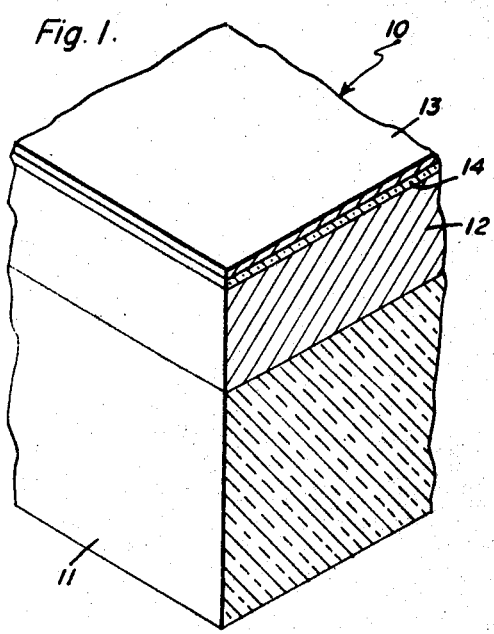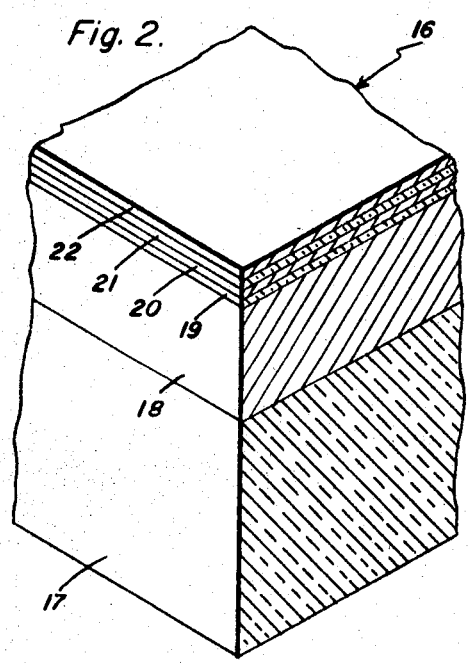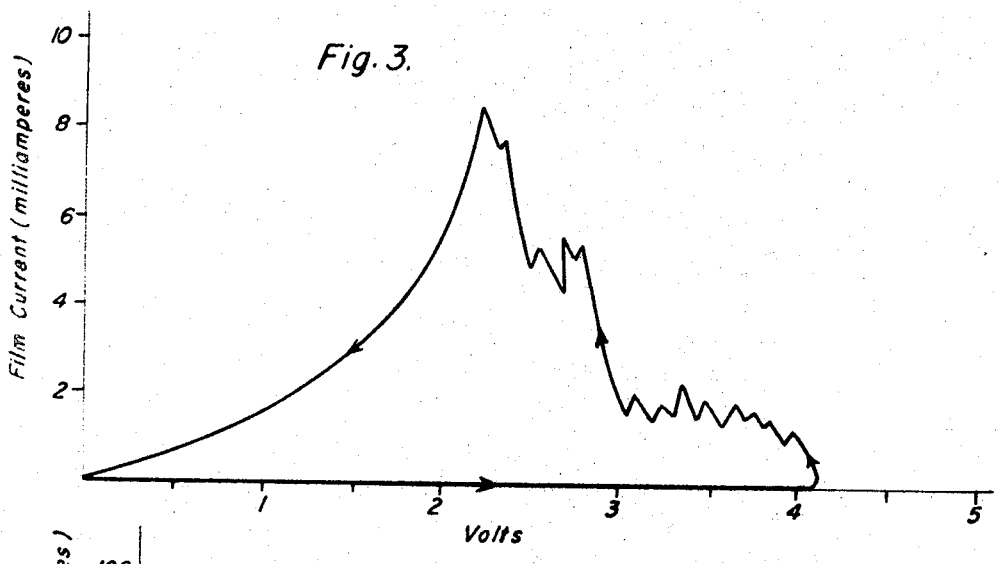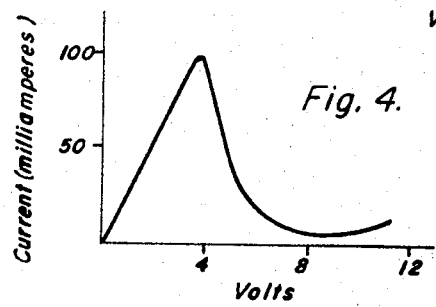
Inventor:
Thomas W. Hickmott,
by
His Attorney.

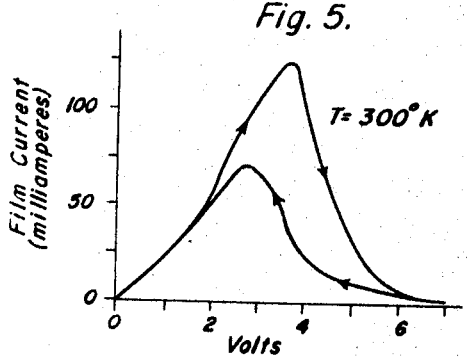
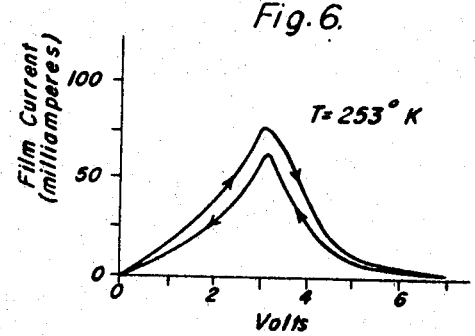
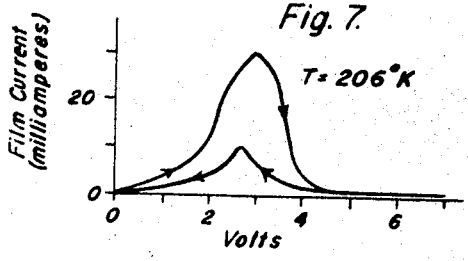
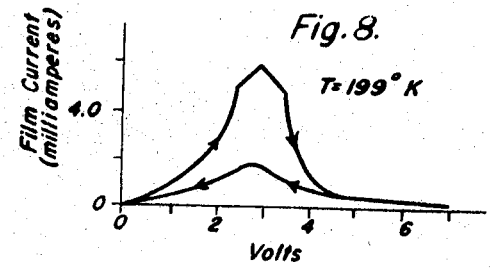
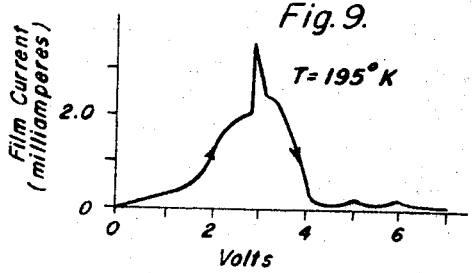
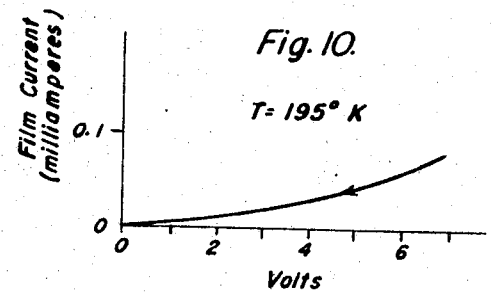
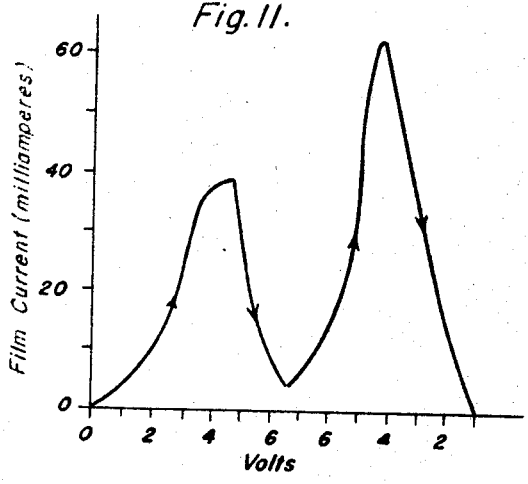
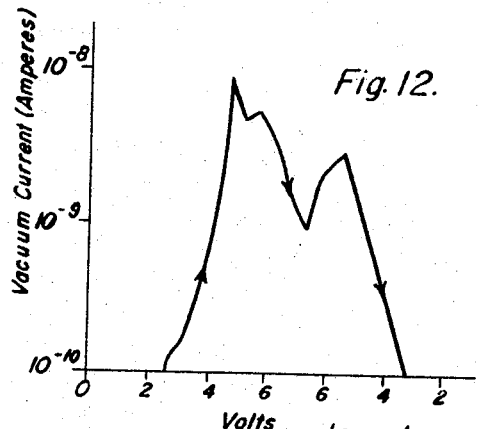
Inventor:
Thomas W. Hickmott,
by ... His Attorney.

Inventor:
Thomas W. Hickmott,
by [signature]
His Attorney.

United States Patent Office 3,447,045
Patented May 27, 1969

---

3,447,045
METAL-INSULATOR-METAL TUNNELING DEVICE WITH EXPONENTIAL I-V CHARACTERISTIC ONLY IN THE NEGATIVE RESISTANCE RANGE
Thomas W. Hickmott, Poughkeepsie, N.Y., assignor to General Electric Company, a corporation of New York
Original application Mar. 22, 1962, Ser. No. 181,677. Divided and this application Sept. 27, 1967, Ser. No. 670,879
Int. Cl. H01l *3/00, 5/06*
U.S. Cl. 317—234
2 Claims

ABSTRACT OF THE DISCLOSURE

Thin film, solid state devices having a room-temperature negative resistance characteristic are made by a process including as a key step impressing a voltage potential across the insulating film of 100–2000 angstroms thickness sandwiched between two metal electrodes until there is a marked increase in the current flowing across the insulating film.

---

This is a division of my copending patent application Ser. No. 181,677, filed Mar. 22, 1962, and assigned to the assignee hereof.

The present invention relates generally to the art of solid state electronics and is more particularly concerned with novel solid state devices incorporating thin insulating films and having unique electrical properties, and is also concerned with new methods for the production of these devices and with atmospheric pressure measuring apparatus incorporating these new devices as essential elements.

It was the primary object of my work resulting in the present invention to provide an electron emitter which would be operable at temperatures within about 100° C. of room temperature, i.e., a cold cathode. A further object was to provide a device of this type which would not be dependent for effective operation upon tunneling electron currents.

In the successful pursuit of these objects, I made a number of unpredicted discoveries and important inventions. Specifically, I found that negative resistance characteristics at large current densities can be obtained in certain novel metal-oxide-metal sandwiches. I also discovered that in these devices, voltage for maximum current depends upon both the particular insulating film and the metal of the counterelectrode but is independent of film thickness over a wide range of insulating film thicknesses and is not field dependent. Further, I found that in these devices, peak-to-valley ratios of 30 to 1 and current densities ranging from a maximum of 30 amperes per square centimeter to a minimum of 0.01 ampere/cm.$^2$ with 10 amperes/cm.$^2$ being typical, are obtained. Switching time from peak current to valley current is less than 0.5 microsecond.

It is another of my discoveries that these devices do not initially display negative resistance characteristics, but that such characteristics are established by the application of suitable direct current or alternating current potentials. Moreover, this negative resistance characteristic is materially affected by the temperature and the atmosphere to which the device is subjected at the time the negative resistance characteristic establishing potential is applied to the device.

While electron emission can be obtained through the use of the devices of the present invention at low voltages such as about 2.5 volts and they are potentially useful therefore as cold cathodes, these devices also have utility as negative resistance circuit components. Thus, the novel triodes of this invention may ultimately prove to be important in a wide variety of electrical circuits and systems. The recognition of the importance of such a triode device is of long standing in the art and yet the demand for such a device has not heretofore been satisfied.

As indicated above, these discoveries were not predictable on the basis of what was previously known in the art. Likewise, the devices of this invention were not known in the art prior to the time that I made these discoveries. Actually, even now there is not enough known about these devices and the means by which they function to state definitely the underlying cause for the phenomena producing these new results. Without implying or accepting any limitation upon the scope of the appended claims, I propose a theoretical explanation of the operation of these devices which clearly does not depend either upon tunneling electrons or upon classical dielectric breakdown effects. Specifically, it is my hypothesis that while it must be assumed that there is some tunneling electron current in all the devices of this invention, the principal or main current is a space charge-limited one. In any case, this concept clearly qualifies as a possible explanation, although perhaps an incomplete and over-simplified one. At the same time, it is recognized that direct current space charge-limited currents have never heretofore been known in insulating films of the type that characterize the present invention devices, and that this theory fails to explain the negative resistance phenomenon of these devices. The fact that the negative resistance characteristic does not appear or is obliterated under conditions in which switching is repeated at a reasonably slow pace also stands unexplained and unexplainable on any basis known to me.

In general, a device of this invention comprises a first electric conductor, an electric insulator through which maximum tunneling electron currents are orders of magnitude smaller than other currents, and a second electric conductor in a sandwich-like arrangement in which the insulator in the form of a continuous film from 80 to 1000 Angstroms thick separates the two conductors and contacts their opposed surfaces. This device is further characterized, as previously indicated herein, in having a negative resistance characteristic and in having a major current flow which is temperature-dependent and a current-voltage relationship which is exponential only in the negative resistance voltage range. Preferably, the insulating film is from 200 to 500 Angstroms thick and in some cases where electron emission effects of a cold cathode are desired, the second or counterelectrode is provided in the form of a film of the order of 40 to 300 Angstroms thick, optimum emission being obtained in the thinnest portion of this range.

In its method aspect, this invention generally comprises the step of subjecting a diode device in the form of a metal-metal oxide-metal sandwich to an electrical potential while maintaining the device under a vacuum of approximately 10$^{-1}$ millimeters of mercury or less. More specifically, this method in a preferred embodiment comprises the steps of anodically oxidizing an aluminum body and forming on it a layer of aluminum oxide from 80 to 1000 Angstroms thick, then depositing a layer of metal from 40 to 300 Angstroms thick on the resulting alumina surface portion of the body, and finally subjecting the resulting diode device to an electrical potential, suitably about four volts in some instances, until a negative resistance characteristic is established. The initial aluminum body or layer is suitably deposited as an evaporated film on a glass substrate surface which has been cleaned and rinsed with acetone so that the metal film will not be subject to blistering in subsequent operations.

Those skilled in the art will gain a further and better understanding of this invention from the detailed description set forth below, reference being made to the drawings accompanying and forming a part of this specification, in which:

FIG. 1 is a fragmentary perspective view partly in section of a typical diode device of this invention;

FIG. 2 is a view like FIG. 1 of a triode device of this invention.

FIG. 3 is a chart bearing a curve illustrating the establishment of the negative resistance characteristic in a device of this invention;

FIG. 4 is a chart bearing a curve illustrating a typical negative resistance characteristic of the present devices;

FIG. 5 is a chart bearing curves illustrating the D.C. current-voltage characteristic of a 450 Angstrom aluminum oxide film at 300° K. under conditions of increasing and decreasing voltage;

FIG. 6 is a chart like that of FIG. 5 bearing a curve representing data gathered on the same specimen at 253° K.;

FIG. 7 is again similar to FIG. 5 except that in this case the temperature was 206° K.;

FIG. 8 represents data for a temperature of 199° K.;

Figure 13:
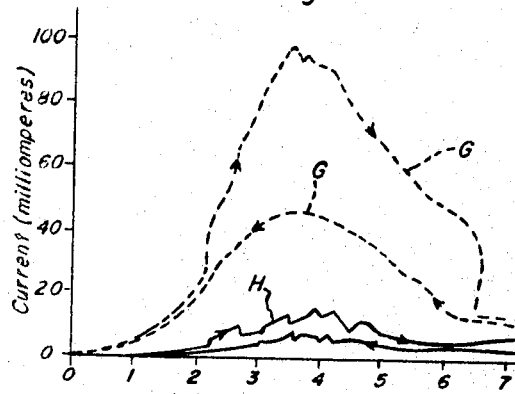
Figure 14:
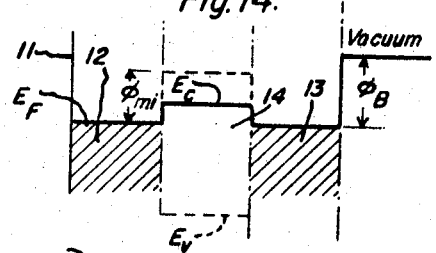
Figure 15:
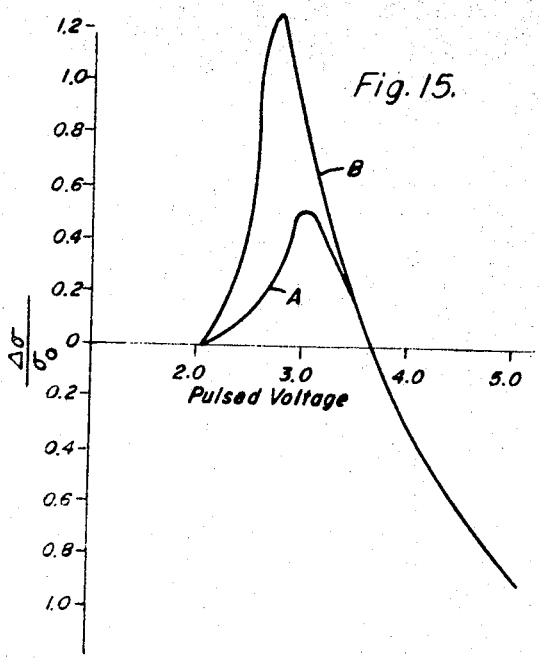
Figure 18:
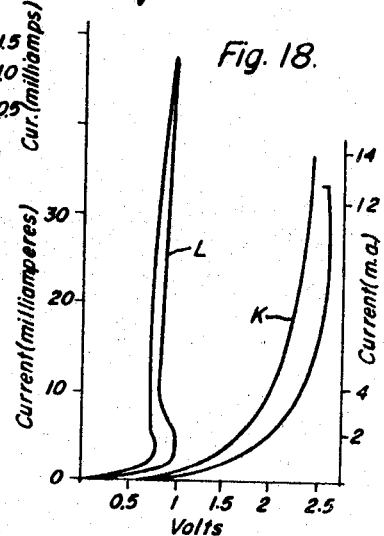
Figure 17:
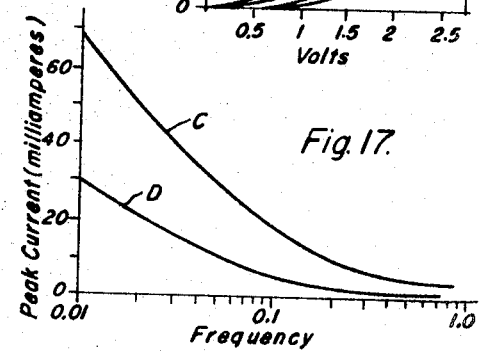
Figure 16:
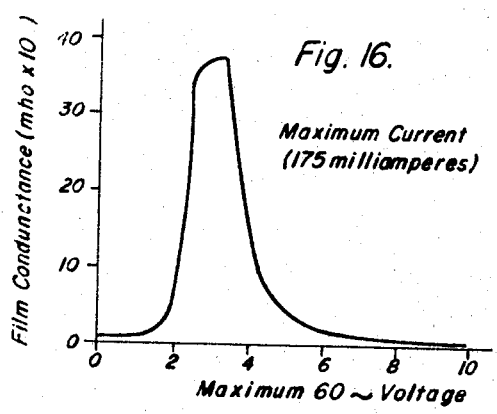
Figure 19:
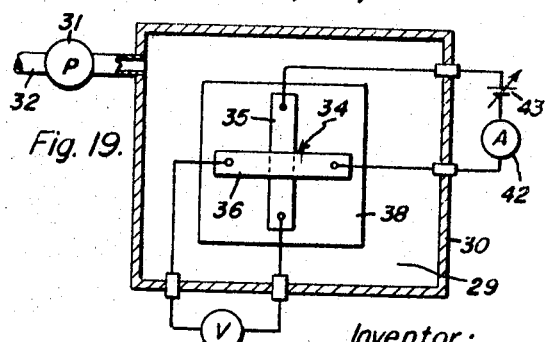

FIGS. 9 and 10, in turn, represent increasing and decreasing voltage, respectively, for tests of the FIG. 5 specimen at 195° K.;

FIG. 11 is still another chart on which film current is plotted against voltage for a typical device of this invention during the establishment of film conductivity;

FIG. 12 is a chart in which vacuum current in amperes is plotted against voltage for the device of FIG. 11;

FIG. 13 is another chart bearing four curves representing the data gathered in testing the effect of atmospheric pressure on current flow through these devices under conditions of increasing and decreasing voltages;

FIG. 14 is an energy diagram representing the diode of FIG. 1;

FIG. 15 is a chart bearing curves illustrating the change of conductivity of an aluminum oxide film by 10 microsecond and 100 microsecond pulses of varying voltage;

FIG. 16 is a chart on which film conductance is plotted against maximum 60-cycle voltage to illustrate the change of conductivity of an aluminum oxide film by increase of alternating current potential across one of these new devices;

FIG. 17 is a chart on which peak current flow through the present devices is plotted against frequency and the two curves represent data gathered first during voltage increases and later during voltage decreases;

FIG. 18 is a chart on which current is plotted against voltage for a novel niobium-niobium oxide-gold diode of this invention both as prepared and after being subjected to dielectric breakdown potential; and FIG. 19 is a schematic view of atmospheric pressure measuring apparatus of this invention incorporating a diode device such as shown in FIG. 1.

As shown in FIGS. 1 and 2, a diode and a triode of this invention may suitably take the form of a combination of metal and insulating films on a glass substrate. Thus, diode 10 is supported on a glass slide 11, the diode comprising a relatively heavy or thick (i.e., 2000 to 4000 Angstroms thick and two millimeters wide) film or coating of aluminum 12, a thin gold film 13 and an insulating film of alumina 14 disposed between and separating coating 12 and film 13. Preferably, insulating film 14 will be from 80 to 1000 Angstroms thick and the counterelectrode 13 will be preferably of from 40 Angstroms to about 300 Angstroms thick if the diode is to be used as a cold cathode. It will be understood, however, that in accordance with this invention, the glass substrate may be eliminated and the aluminum base electrode may be 10 or 20 mils thick or even heavier, depending upon the rigidity and other physical requirements of the intended use of the device. Also, it will be understood that other metals may be employed as base electrodes in these devices and that all metals except mercury, in fact, are contemplated for both base electrodes and counterelectrodes. The use of mercury is not contemplated because these devices generally lose their unique electrical characteristics at temperatures approaching the freezing point temperature of mercury. The use of alkali metals is feasible where the environment of the use is not detrimental to these metals. Gold, however, is preferred for the counterelectrodes of these devices because it is easy to apply and gives maximum currents with minimum breakdown difficulties.

While alumina has been disclosed as preferred insulator film materials, I contemplate the use in these novel devices of magnesia, beryllia, and alkali metal halide films as insulators. Also, the oxides of the various metals stated above as being suitable as base electrodes may advantageously serve as insulator films and may be formed by the anodization method described in detail herein and set forth in appended claims.

Triode 16, as shown in FIG. 2, is similarly supported on a glass slide 17 and comprises aluminum layer or coating 18 in the form of a strip, an alumina film 19 covering strip 18, an aluminum film 20 as an intermediate electrode overlying film 19, a second alumina film 21 covering film 20, and a gold film 22 covering insulating film 21. Again, the insulating layers or films 19 and 21 are of thickness of the order of 80 to 1000 Angstroms and intermediate aluminum film 20 is from 100 to 400 Angstroms thick while gold film 22 is from 40 to 200 Angstroms thick.

Diode 10 and triode 16 are made in accordance with the method of this invention by first thoroughly cleaning the glass substrate bodies or slides 11 and 17 and finally rinsing their surfaces with acetone in preparation for the establishment of aluminum base layers 12 and 18. These relatively thick aluminum layers are formed by a conventional evaporation technique, the aluminum being vaporized in a vacuum of $10^{-4}$ mm. of mercury or less and condensed on the surface of slides 11 and 17 which have been suitably masked to provide the form of aluminum strip deposit desired. Aluminum layers 12 and 18 are then anodized to form an insulating oxide coating or film of the required thickness. For this purpose, a fused mixture of ammonium bisulfate and potassium bisulfate is employed, this being a eutectic melting at 150° C. and having a sufficiently low viscosity above 180° C. that anodization can occur rapidly. Thus, to retard deterioration of the melt, a stainless steel cathode is employed and oxygen is bubbled through this cathode throughout the anodization operation. Anodization is accomplished at a current density of 0.5 to 5.0 milliamperes per square centimeter. The resulting anodized films are dense and resistant to chemical attack and typically have a sulfur content of about 5 percent in the form of $KAl(SO_4)_2$ and are amorphous but contain no hydroxyl ion. I have found, however, that aluminum oxide films formed in a solution of boric acid and borax in water and therefore containing no sulfur have essentially the same electrical properties as the films produced through the use of the fused bisulfate eutectic. The same current density conditions are employed in the two cases.

Following the formation of the anodized (alumina) films, a second metal film-depositing operation is carried out by the aforesaid evaporation technique, the metal in the case of diode 10 being gold while in the case of triode 16 it is again aluminum. In each instance, however, the thickness of the evaporated metal deposit is effectively controlled within predetermined limits by selecting the amount of metal supplied for evaporation. Following this step, diode 10 is complete and ready for treatment to produce the negative resistance characteristic and other electrical properties while triode 16 is subjected to a second anodization treatment to produce alumina film 21, and then is provided with counter-electrode 22 by a final gold evaporation step. This second anodization is accomplished through the use of the boric acid-borax aqueous solution because the bisulfate treatment is too severe for easy control over the anodization of the comparatively thin intermediate electrode.

When the devices are assembled as shown in FIGS. 1 and 2, electrical contacts are made to the non-active portions, i.e., the free end portions of crossed electrode strips, by means preferably of conventional spring clips (not shown) but suitably by soldered lead connections.

As the final step in the production of diode 10 and triode 16, an electrical potential is established through the electrical leads and contacts across the diode and the triode and, as shown in the chart of FIG. 3, as the voltage is gradually increased, a critical voltage is reached at which a sharp increase in current through the device occurs. This increase is indicated to take place at about 4.1 volts in the case of diode 10 and triode 16, and on lowering the voltage across the insulating film or films of these devices, a pronounced negative resistance region appears. Then on raising the voltage to successively higher levels, the current-voltage characteristic continues to show a negative resistance region for both increasing and decreasing voltages. Furthermore, it has been observed that currents through the oxide film or films of these devices at this stage of production are noisy and highly erratic but on successive tracings, they become much less erratic. Further, the voltage for the onset of the sharp increase in film conductivity indicated at 4.1 volts in this case will vary from device to device and from insulating film to insulating film, but normally will occur at higher voltages for thicker films. Breakdown of the insulating films, in the sense of the sharp current increase occurring at 4.1 volts in the present cases, produces an irreversible and permanent change in the insulating or aluminum oxide film, the original high resistivity and exponential dependence of current on voltage not being recovered in subsequent use or tests. However, breakdown that causes increased alumina conductivity and negative resistance is not the same as the dielectric breakdown which destroys the insulating film altogether.

The negative resistance characteristic is observed in the devices of this invention with either the aluminum electrode or the gold electrode positive and without any qualitative difference in the characteristics.

It is important in the establishment of the negative resistance characteristics of these devices that the devices be maintained under vacuum. Attempts to produce negative resistance properties in such devices in air have not proven successful in that currents which flow through the insulating films of the devices are invariably small and extremely erratic at voltages less than the voltages at which the dielectric breakdown occurs. Incidentally, dielectric breakdown in the films occurs in these devices at the same voltage in either air or vacuum and the destroyed films have the same appearance after breakdown in either medium. It has been found, however, that once established, the electrical characteristics of the present devices are not changed as a result of an increase in pressure in the bell jar to atmospheric pressure, except that there is a marked reduction in the peak current and the valley current. Moreover, by reversing the sequence just described and subjecting these devices in the atmosphere to electrical potentials insufficient to produce dielectric breakdown of their insulating films, but sufficient under vacuum conditions to establish negative resistance characteristics, does not prevent the subsequent establishment of those characteristics when the required vacuum condition is met.

The effect of temperature upon the current-voltage characteristics of these devices is illustrated in a series of charts set out in FIGS. 5 to 10, inclusive. The shape of the curves in these charts and particularly the location of the peak current remains unchanged, but between 300° K. and 206° K., the peak current decreases from 130 ma. to 35 ma. and between 206° K. and 195° K., the peak current decreases from 35 ma. to 2 ma. Also, the peak current was invariably greater on the increasing voltage side than on the decreasing voltage side and the negative resistance characteristic vanished entirely for decreasing voltage in the case of the 195° K. test. It was found, however, that increasing temperature above 195° K. resulted in the re-establishment of the negative resistance region and the raising of the film to room temperature resulted in a maximum current as large as had originally been observed. Thus, reducing film temperature decreases the film conductivity reversibly while the negative resistance region remains unchanged until it disappears completely over a narrow temperature range of only one or two degrees. Raising the temperature allows higher film conductivity and negative resistance to re-establish, and raising the film temperature to 300° K. restores the initial current-voltage characteristic.

With reference to FIG. 16, negative resistance observed in these devices when slowly varying D.C. voltage is applied is no longer found when 60-cycle voltage from a low impedance source is applied. Instead, the locus of the maximum A.C. voltage traces out the D.C. negative resistance characteristic. In FIG. 16, film conductivity is plotted against maximum applied potential and peak values of conductivity occur at voltage corresponding to the maximum current for slow D.C. voltage changes. If the D.C. negative resistance were traced for 60-cycle voltages, there would be a peak in the current at about three volts and a region of negative slope above three volts, as this chart and FIG. 4 indicate. Conductivity of the aluminum oxide films of these devices can be varied over wide limits by varying voltages across the film as shown for 60-cycle potentials in FIG. 16. If conductivity is measured with a small voltage, where current-voltage relations are linear, changes of conductivity reflect changes in the number of mobile charge carriers in the oxide. Further, pulsed voltages of one microsecond duration or greater can remove or inject carriers as well as 60-cycle voltages can.

Changes in oxide film conductivity in these devices that can be made by single voltage pulses are indicated in FIG. 15 wherein Curve A represents data accumulated for 10 microsecond pulses and Curve B represents data for 100 microsecond pulses. To obtain these data, film conductivity was established at some desired value, $\sigma_0$, and measured by a 0.3 volt signal. With the A.C. measuring signal removed, a single 10 microsecond pulse or 100 microsecond pulse of arbitrary amplitude was applied to the device from a Tektronix Type 163 Pulse Generator. Current-time and voltage-time traces for the single pulse were then measured on a Tektronix Type 555 Dual-Beam Oscilloscope to determine the voltage across the film just as the voltage pulse was turned off. Film conductivity, $\sigma$, was again measured with the small A.C. signal, the conductivity was re-established to its initial value, $\sigma_0$, and the cycle was repeated. For low initial film conductivities, as indicated in FIG. 15, there were large increases in $\Delta\sigma/\sigma_0$ by 10 microsecond pulses. Further, it can be seen from this chart that pulses of longer duration produce greater changes in film conductivity although voltages that increase or decrease conductivity are the same. The extreme example of this effect is that slowly varying D.C. voltages which produce negative resistance in the current-voltage curves will also produce the maximum film conductivity in the devices of this invention.

I have found that in multifilm or multielectrode devices of this invention, as represented by triode 16 of FIG. 2, middle electrode 20 was large enough that there was no direct path from base aluminum electrode 18 to top gold electrode 22. In such devices, a negative resistance characteristic and high conductivity were established between the base electrode and the top electrode without having any detectable conductivity between the base electrode and the middle electrode or between the middle electrode and the top electrode. Thus, for example, in a specific case, 0.5 volt between base and top electrode produced a current of 43 ma. between these two electrodes and the same voltage between the middle and top electrodes in one instance and between the middle and base electrodes in another instance resulted in less than 0.01 ma. passing between these electrode pairs. If a voltage high enough to develop conductivity and establish a negative resistance characteristic is applied to middle electrode 20, current could then be drawn between any pair of electrodes in the triode 16. As previously indicated, in the production of triode 16, the base electrode and top electrode were evaporated in such a way that there was no direct path between them except through the middle electrode and the middle electrode was formed as an aluminum film from 300 to 600 Angstroms thick and then anodized to form an aluminum oxide film that was about 200 Angstroms thick. Evaporated films of this thickness normally have a discontinuous structure with many small holes in them and anodizing such initially discontinuous film produces even more tiny holes in the middle electrode. Current then will pass through these holes in flowing between the base electrode and the top electrode during the period of the establishment of film conductivity. The lack of current to the middle electrode as well as its inability to affect current flow between the base and top electrode indicate that the barrier to conduction is at the oxide-metal interface, and that forming of conducting oxide films occurs at the same interface.

I have found that the unique negative resistance characteristic and other electrical properties of the present devices may be obtained where tantalum, titanium or zirconium are substituted for the aluminum base electrode and the preparation of the anodized film is the same as in the case of the aluminum base electrode as previously described herein. In the case of tantalum, titanium or zirconium, however, the base film or electrode is prepared by sputtering in argon and anodizing is accomplished through the use of a saturated solution of ammonium borate in ethylene glycol with four percent water added to increase solution conductivity. Alternatively, these base electrodes, as in the case of the aluminum base electrode, may suitably be in bulk or massive form instead of in the form of thin films and thus may suitably be of thickness of the order of 10 or 20 mils or somewhat thicker or thinner, depending upon the physical requirements of contemplated use of the ultimate device.

I have also demonstrated the utility of silicon monoxide films as insulating bodies for the devices of this invention, these being prepared by evaporation on the aluminum base electrode or on intermediate aluminum electrode 20 in the case of triode 16. Gold counter-electrodes were formed in these instances by the evaporation technique described above, the same masking technique also being used as in the cases previously described herein.

Referring now to FIGS. 11 and 12, electron emission into vacuum from diode 10 has been observed to occur both during the formation of the film electrical characteristics and after the unique negative resistance characteristic has been established. But electrons appearing in the vacuum are not in any case due to tunneling between the electrodes. In these two charts, the current between the electrodes of diode 10 and the current emitted into vacuum are both illustrated for the same voltage across the oxide film. FIGURE 11 shows the current through the oxide film as a function of the voltage across it while FIG. 12 shows the current emitted into vacuum for the same diode at the same voltage. Thus, FIG. 12 indicates that electron emission during the forming of a $5 \times 10^{-6}$ cm. film can occur at voltages as low as 2.5 volts, substantially below the work function of gold which is 4.7 volts. Once the negative resistance characteristic is established, electron emission is closely tied to whatever mechanism is necessary for switching from maximum to minimum current. Electron emission into the vacuum shows a second maximum at voltages just below those which will produce dielectric breakdown of the insulating film. Maximum electron emission which has been observed is $2 \times 10^{-6}$ amperes with 13 volts across the film and a current between the aluminum electrode and the gold electrode of about $1 \times 10^{-3}$ amperes.

On the chart of FIG. 17, frequency in cycles per second is plotted against peak current in milliamperes and data collected during the period of increasing voltage are represented by Curve C while data collected during the decreasing voltage phase are represented by Curve D. In gathering these data, a diode like that of FIG. 1 was employed and it is seen that the characteristic of higher peak currents in the increasing voltage stage is clearly defined over the entire frequency range of the test from 0.1 to approximately 1.0 cycle per second. Also, as the frequency is increased, the peak current declines steadily for both increasing voltage and decreasing voltage.

With reference to FIG. 13, the effects of vacuum and atmospheric pressure on current flow through the devices of this invention, as exemplified by the diode of FIG. 1, are illustrated. Thus, Curve G represents data gathered under vacuum conditions during increasing and decreasing voltage cycles, as indicated by the arrows, over a voltage range of about 9.5 volts. A peak of about 100 ma. was reached on increasing voltage at about 3.5 volts while the maximum current flow on the decreasing voltage side was about 44 ma. at about 3.7 volts. Throughout this test, the diode was maintained under a vacuum of $10^{-2}$ mm. of mercury. By comparison, as indicated by Curve H, only very little current flow through the same diode was measured in a test conducted at atmospheric pressure and there was little difference between the increasing and decreasing voltage sides in respect to the current flowing through the diode at any particular voltage. Thus, the devices of this invention are quite sensitive under pressure and particularly atmospheric pressure and may be employed as means for measuring pressure and changes therein.

A device for implementing the use of the present invention diodes and similar elements as pressure-sensitive or pressure-measuring elements is illustrated in FIG. 19. In this drawing, a vessel 30 providing a vacuum chamber 29 is equipped with a pump 31 communicating with the chamber through a conduit 32 for evacuating the chamber. A diode 34, generally of the form illustrated in FIG. 1, is disposed in chamber 31 and operatively connected to means external to the vessel for indicating electrical characteristics of the diode. Diode 34 comprises a base electrode 35 and a counterelectrode 36 arranged in cruciform pattern on a glass plate 38 on which the electrodes have been deposited by the evaporation technique previously herein described. Between electrodes 35 and 36, there is an insulating layer (not shown) also as previously described, preferably of 200 to 500 angstroms thickness and produced by anodization in accordance with the method of this invention. One pair of adjacent ends of electrodes 35 and 36 are connected to a voltmeter 40 outside vessel 30 while the other ends thereof are connected to an ammeter 42 and a variable potential source 43 also outside vessel 30. Accordingly, in actual use, readings may be taken over the operating temperature range of the diode and current flow through the insulating film of the diode may be compared with corresponding voltage points on Curves G and H of FIG. 13. Ranges of pressure between the vacuum condition of Curve G and the atmospheric condition prevailing in the Curve H test may be calibrated in terms of ammeter readings for direct measurement of pressure within vessel 30 at any given time.

Electrical properties of a typical device of this invention, as represented by the diode of FIG. 1, are illustrated in the energy diagram of FIG. 14 wherein FIG. 1 reference characters are used to identify corresponding elements. In this diagram, $E_v$ represents the top of the valence band of the insulator while $E_c$ represents the bottom of the conduction band of the insulator and the vertical dimension $\phi_{mi}$ represents the barrier to the emission of electrons from aluminum body 12 into alumina film 14. The work function of the gold is represented by $\phi_B$ and is the barrier to emission of electrons from gold film 13 into the vacuum. The hypothesis is made that the process of establishing conductivity in these films by applying a voltage in vacuum reduces $\phi_{mi}$ to a low value (0.1 to 0.5 electron volt). For such low values of $\phi_{mi}$, electrons can be thermally emitted from the base electrode into the insulator and the current through the oxide film may be space charge-limited. Assuming an ideal insulator, current flow through a space charge-limited diode such as the diode of FIG. 1, is given by the expression:

$$I = 10^{-13} \mu \kappa \frac{V^2}{d^3}$$

in which I is amperes per square centimeter, $\kappa$ is the dielectric constant of insulator 14, $d$ is the thickness of insulator 14, V is the applied potential in volts, and $\mu$ is the electron mobility in insulator 14. This expression applies for currents below peak currents but nothing is known definitely about what occurs in respect to current flow in the negative resistance region and therefore this phenomenon cannot be reduced to a precise expression.

In a special form of this invention, a diode like that of FIG. 1 is provided by sputtering onto a glass slide a thin film of niobium and anodizing a portion of the resulting niobium strip to provide a thin niobium oxide film, and then evaporating gold and depositing on the slide as a film a gold electrode in the form of strip disposed across the oxidized niobium strip at generally right angles thereto. The base niobium electrode, as in the case of the aluminum electrode 12, may be relatively thin or quite thick and may take the form of a self-supporting strip or body as, for instance, a 10 or 20 mil strip or even a thicker element. In this case, glass slide 11 would not be employed but, in any event, the novel electrical characteristics of the device will still be obtained. Similarly, the gold counterelectrode will be preferably of the order of thickness described previously with respect to FIG. 1 and the insulating oxide film of niobium oxide between two electrodes will be preferably from 200 to 500 Angstroms thick but suitably may be from 80 to 1000 Angstroms thick.

Electrical characteristics of such a niobium-niobium oxide-gold diode are indicated in FIG. 18, wherein current in milliamperes is plotted against potential in volts and Curves K and L representing, respectively, the data obtained in tests below breakdown voltage and data obtained in tests after the negative resistance characteristic of the device has been established by subjecting it to breakdown voltages.

These niobium diodes, as FIG. 18 indicates, have rather special electrical characteristics which make them potentially useful as voltage limiters in circuits based on thin films or where a compact solid state unit is required. Thus, they might be used in place of Zener or breakdown diodes, where they would hold the advantage, because of their lower operating voltage, of causing less power dissipation. Further, the negative resistance property of these diodes, and particularly their operability over very broad temperature ranges extending down to liquid nitrogen temperatures and the voltage ranges over which this property is obtained, makes these devices specially useful.

The following illustrative, but not limiting, examples are offered to apprise further those skilled in the art of the precise nature of the devices of the present invention and the manner of their production:

Example I

A diode of the type illustrated in FIG. 1 was produced by vapor-depositing aluminum in the form of a thin film strip on a suitably-masked, clean surface of a glass slide, the slide being prepared by thorough washing and removing of all adhering films and dirt particles from its surface and then rinsing the body with acetone. The evaporation of aluminum to produce the vapor was accomplished in a manner that is now standard practice in the art, a bell jar being employed and aluminum foil being volatilized from a tungsten filament. The resulting aluminum film, which was of the order of 2000 Angstroms thick and apparently substantially uniform in thickness throughout its width and length, was then immersed in a melt of a eutectic ammonium bisulfate-potassium bisulfate mixture at a temperature of about 200° C. for about 30 seconds while being subjected to a current density of about two milliamperes per square centimeter. At this stage, a transfilm voltage value of 20 volts was measured in the film. Following rinsing of the glass slide and adhering electrode film and removal of substantially all adhering bisulfate melt therefrom, a layer of gold in the form of a thin film strip running at substantially right angles to the aluminum electrode was vapor-deposited on the glass slide through a suitable mask to provide a cruciform electrode assembly. The gold film, as in the case of the aluminum film, was produced by vapor deposition in vacuum of about $10^{-4}$ mm. of mercury in a bell jar and was of the order of 150 Angstroms thick and apparently substantially uniform in thickness throughout its length and width. The resulting diode device, while under vacuum of 0.01 mm. of mercury, was subjected to a potential ranging up to 9 volts, suitable leads being provided and coupled to the aluminum and gold electrodes by means of spring clips near the ends of the electrodes away from the active central area of the assembly. It was found that maximum current flow through the anodized film approximately 450 Angstroms thick in this particular case was obtained at 2.9 volts.

Example II

Another diode similar to that of Example I, but including a silicon monoxide insulating layer 500 Angstroms thick instead of the alumina layer of Example I, was provided by following the steps set out in Example I. However, the silicon monoxide film was formed by conventional vapor deposition technique. Under actual test, maximum current flow through this diode was obtained at 3.1 volts.

Example III

Still another diode device like that of Example I was made after the manner described in Example I, the exception being that a sputtered tantalum film instead of a vapor-deposited aluminum film was employed in making the base electrode. Also, instead of employing the bisulfate eutectic melt, anodization was accomplished through the use of a saturated five percent solution of ammonium borate in ethylene glycol with water added. The transfilm voltage of the resulting 450 Angstrom-thick oxide film was 30 volts. In testing this diode device following the establishment of its negative resistance characteristics, it was found that maximum current flow between the base and gold counter-electrodes occurred at 2.2 volts.

Example IV

In following the procedure of Example I, a zirconium-zirconium oxide-gold sandwich was produced. Again, as in Example III, a sputtered zirconium film was substituted for aluminum as base electrode metal and anodization was accomplished through the use of ammonium borate-ethylene glycol solution like that of Example III instead of the bisulfate eutectic melt. The anodization current density, however, was the same as in the foregoing cases and the oxide film was about 300 Angstroms thick with a transfilm voltage of about 15 volts. The resulting diode under test proved to have maximum current flow at 2.1 volts.

Example V

The procedure of Example III was again repeated in the production of a titanium-titanium oxide-gold diode which proved to have a maximum current at 1.7 volts. Again, the anodization was accomplished in accordance with the procedure of Example III and the resulting titanium oxide film was about 400 Angstroms thick and had a transfilm voltage of 20 volts at completion of anodization.

Example VI

A niobium-niobium oxide-gold diode was produced by sputtering niobium through a mask onto the thoroughly cleaned surface of a glass slide and anodizing the resulting thin film strip niobium electrode using a saturated solution of ammonium borate and ethylene glycol to which five percent of water was added. The time and current density conditions for this anodization operation were as described in Example III, with the result that a niobium oxide film approximately 500 Angstroms thick and having a transfilm voltage of 20 volts was formed over the surface of the niobium electrode. Again, a gold counterelectrode was vapor-deposited on the slide through a suitable mask in the form of a thin gold strip of about 100 Angstroms thickness disposed at right angles to and across the central portion of the niobium base electrode. Under test, this diode did not show negative resistance as developed in Examples I-V, but showed current-voltage curves as indicated in FIG. 18.

It will be understood that wherever parts, proportions or percentages are stated herein or in the appended claims, it is the weight basis rather than the volume basis that is referred to.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the specifically-described embodiments of the invention may be made without departing from the scope of the invention as set forth in what is claimed.

What I claim as new and desire to secure by Letters Patent of the United States is:

1. A method of improving the electrical properties of a thin film structure comprising a first film of electrically conductive metal, a film of aluminum oxide deposited on said first film and another film of electrically conductive metal, said film of aluminum oxide having a thickness in the range of 100–1000 Angstrom Units and being positioned between and in contact with said films of electrically conductive metal, said films of electrically conductive metal having a thickness in the range of 100–2000 Angstrom Units, which method comprises impressing a voltage potential across said film of deposited aluminum oxide for a period of time, said voltage potential and said period of time being sufficient to effect a marked increase in the current flowing across said film of aluminum oxide at the end of said time period as compared with the current flowing across said film of aluminum oxide at the beginning of said time period.

2. A solid state device having a negative resistance characteristic and in which major current flow is temperature-dependent and the current-voltage relationship is exponential only in the negative resistance voltage range which comprises a first electric conductor, an electric insulator through which maximum tunneling-electron currents are orders of magnitude smaller than other currents, and a second electric conductor in a sandwich-like arrangement with the insulator in the form of a continuous film from 80 to 1000 Angstroms thick disposed between and separating the first and second conductors and contacting the opposed surfaces of the said conductors.

References Cited

UNITED STATES PATENTS

| 3,121,177 | 2/1964 | Davis | 307—88.5 |
| 3,056,073 | 9/1962 | Mead | 317—234 |
| 3,259,759 | 7/1966 | Giaever | 307—88.5 |

JOHN W. HUCKERT, *Primary Examiner.*

M. EDLOW, *Assistant Examiner.*

U.S. Cl. X.R.

117—212; 317—235